Jan. 28, 1930.  C. VON HOFE ET AL  1,744,994
SIGHTING TELESCOPE FOR ORDNANCE, MACHINE GUNS, AND THE LIKE
Filed Oct. 20, 1926
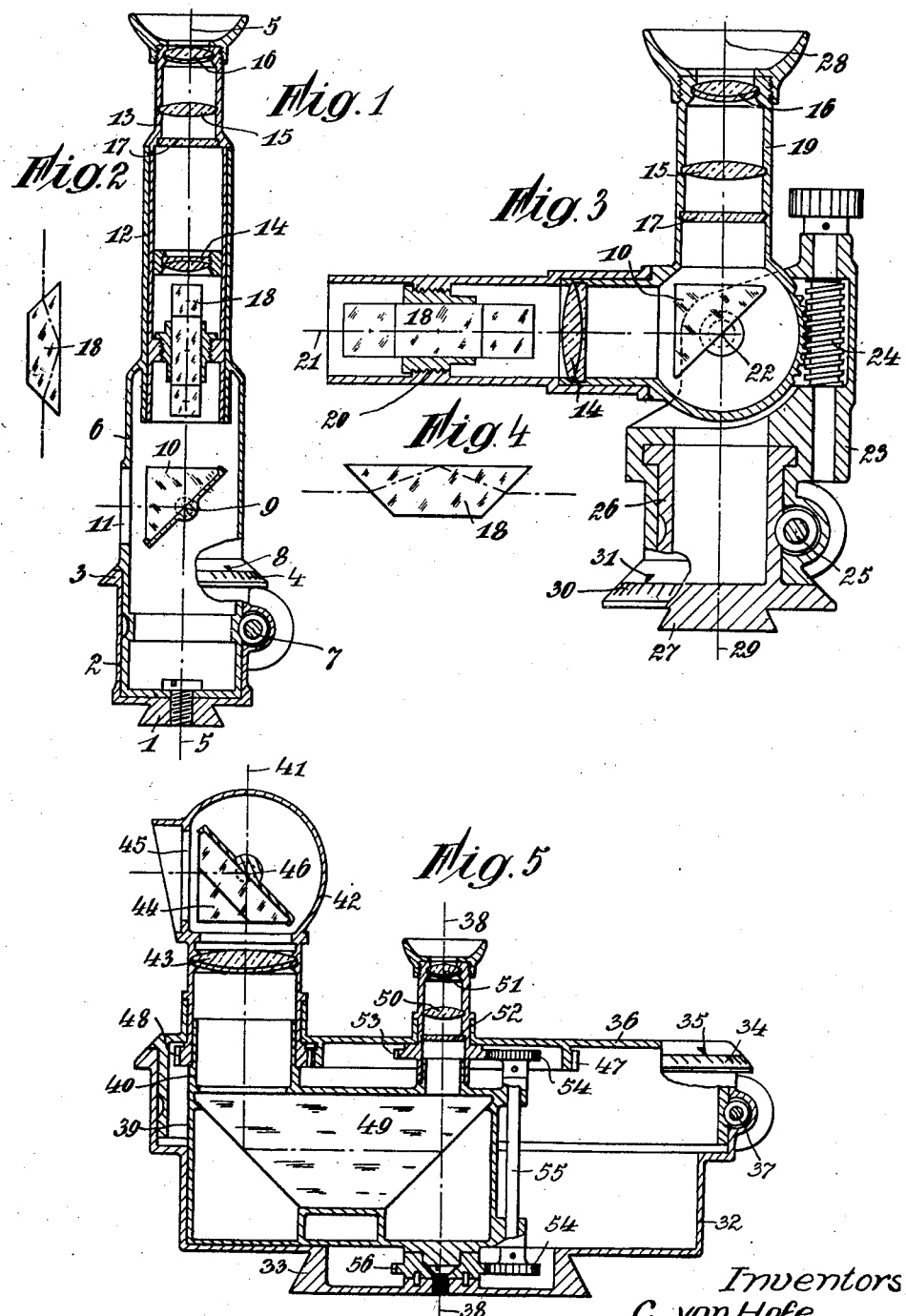
Inventors
C. von Hofe,
K. Petschenig,
and J. Schier
by Langner, Parry, Card & Langner
Att'ys.

Patented Jan. 28, 1930

1,744,994

UNITED STATES PATENT OFFICE

CHRISTIAN VON HOFE, KARL PETSCHENIG, AND JOHANN SCHIER, OF VIENNA, AUSTRIA, ASSIGNORS TO THE CZECHOSLOVAK FIRM C-P. GOERZ OPTISCHE ANSTALT AKTIENGESELLSCHAFT, AKCIOVA SPOLECNOST K. P. GOERZ OPTICKY USTAV, OF BRATISLAVA, CZECHOSLOVAKIA

SIGHTING TELESCOPE FOR ORDNANCE, MACHINE GUNS, AND THE LIKE

Application filed October 20, 1926, Serial No. 142,951, and in Czechoslovakia August 21, 1926.

Sighting telescopes for ordnance machine guns and the like which telescopes are provided with a set of prisms for producing upright images and have an objective opening adapted to turn around a substantially vertical axis for facilitating firing on targets in the proximity of the horizon have already been constructed and are much in use and known as periscopic sighting telescopes. These telescopes in which the ocular pencil of rays reaches the eye of the observer in a direction parallel to the incoming pencil of rays necessitate when used in connection with some classes of fire arms a very awkward position of the body of the observer which results in faults in the adjustment to the target sighted. This drawback met with in all guns having a low gun carriage is not entirely done away with by the known arrangement of an ocular sometimes used having an oblique position relatively to the eye.

The object of our invention is to provide a sighting telescope which permits a convenient and therefore exact sighting even with the lowest gun carriages met with in practice. This object is realized by a sighting telescope of the class referred to in which the set of prisms producing an upright image brings about a deflection of the pencil of light by about 90° and consists of two parts rotatable the one relatively to the other of which parts at least the one carrying the objective opening is rotatable around the vertical axis the two parts being adjustable relatively to each other in such a manner that always an upright image is offered to the observer whatever may be the position of the objective opening, the observer not changing his position.

This telescope will be so arranged on the fire arm that the observer when lying on the ground, which is the usual position in operating the fire arm, can readily look into the ocular from the top. The adjustment of the two parts of the set of prisms rotatable the one relatively to the other may be effected by hand or a coupling may be provided on the sighting telescope which so connects the two systems of prisms with each other that the upright position of the image is maintained while the objective opening is rotated.

The construction of the sighting telescope is particularly suited for the purpose, if the one part of the set or system of prisms consists of an erecting rhomboid prism having a reflecting hypotenuse face and deflecting downward the incoming rays by an angle of 90° while the other part of the system of prisms is formed by a right angle reflecting prism having two mirror faces at right angle to each other and deflecting the incoming rays upwards by an angle of 180° such mirror prism being rotatable around the optical axis of the ocular together with the first part of the set of prisms while this first part is rotatable together with the objective opening relatively to the other part around the axis of the pencil of rays deflected downwards.

For the sake of a simple construction of the sighting telescope it is desirable to connect the ocular with the last named part of the system of prisms. In this case it partakes in all rotations around its optical axis made by the system of prisms. Such rotations of the ocular are frequently undesirable if in the focal plane of the ocular a plate is provided carrying a mark designed to coincide with the target as is in general use in sighting telescopes, such mark then rotating likewise relatively to the observer whose position on the fire arm is maintained unaltered. These rotations are of no consequence only if the target mark has a shape concentric to the point of intersection of the optical axis of the ocular and the plane of the mark. In other cases it is advisable to so construct the sighting telescope that the ocular does not partake in the rotations of the system of prisms around the ocular axis. This may be done by rigidly connecting the ocular either with the fire arm itself or with some part immovably attached to the fire arm for instance with the casing of the sighting telescope or it may be done by coupling the ocular with the system of prisms by a gearing which rotates the ocular through the same angle as the system of prisms but in the opposite direction.

In the drawing three constructional forms of the improved sighting telescope embodying the invention are shown by way of example. Fig. 1 is a sectional front elevation of the first constructional form and Fig. 2 is a side elevation of a detail. Fig. 3 is a sectional side elevation of another constructional form and Fig. 4 is a plan view of a detail thereof. Fig. 5 is a sectional elevation of a third constructional form.

In the first constructional form (Figs. 1 and 2) a casing 6 rotatable around its vertical axis 5 is mounted in a sleeve 2 to be fastened to the fire arm by means of a dove tail 1. The upper end of the sleeve is provided with an outstanding conical flange 3 bearing a circumferential scale 4. The casing 6 is adjustable by means of a worm 7 and carries a pointer 8 moving along the scale 4. An erecting rhomboid prisms 10 is journalled in the casing 6 on a shaft 9 intersecting the axis 5 at right angles so that its light ray receiving side is opposite the objective opening 11 of the casing 6 and reflects upwards in the direction of the axis 5 the rays entering through the said objective opening. The casing 6 carries an upward tubular extension 12 in which is rotatably mounted a telescope comprising a casing 13, an objective lens 14 and a double lens 15, 16. In the focal plane of the ocular there is mounted a plate 17 with a target mark and in front of the objective 14 and in the optical axis thereof a double rectifying prisms 18 is mounted.

On sighting a target by means of the sighting telescope the adjustment for the lateral angle is made by turning the casing 6 by means of the worm 7 and the adjustment for the altitude is made by turning the prism 10 around the shaft 9. The lateral angle or azimuth of the target is indicated by the pointer 8 on the scale 4. The image produced in the telescope can be so adjusted by turning by hand the telescope in the tubular extension 12 of the casing 6 that the observer sees it upright through the ocular 15, 16. As in this case the target mark plate 17 is turned with the telescope, the preferable form for the target mark to be used in this constructional form is that of a circle in the target mark plate concentric to the axis of rotation of the same.

In the second constructional form (Figs. 3 and 4) the optical elements of the first example viz: the objective lens 14 of the telescope the double lens ocular 15, 16 the target mark plate 17, the double rectifying prism 18 and the erecting rhomboid prism 10 are mounted in an angular telescope casing 19 the arrangement of these elements being different in so far as the prism 10 is now interposed between the objective lens 14 and the target mark plate 17. The rectifying prism 18 and its holder 20 which forms the objective opening of the telescope are rotatable on the telescope casing 19 around the optical axis 21 of the objective 14 of the telescope. The telescope casing 19 is rotatable around an axis 22 intersecting the axis 21 at right angles and located in the hypotenuse face of the prism 10 by means of a worm 24 in a housing 23. The latter is rotatable by means of a second worm 25 on a carrier 26 provided with a dove tailed projection 27 for attaching the apparatus to the gun. The axis of rotation 29 of the carrier 26 intersects the axis of rotation 22 at the point of intersection of the latter with the axis of the objective 21 and is in alignment with the ocular axis 29 when the incoming rays are horizontal. The carrier 26 is provided with a scale 30 cooperating with a pointer 31 on the housing 23.

The adjustment of the sighting telescope to a target is effected by adjusting the lateral angle by rotating the housing 23 on the carrier 26 by means of the worm 25 and adjusting the vertical sight angle by turning the casing 19 by means of the worm 24. The lateral angle of the target may be read on the scale 30 by means of the pointer 31. The image seen by the observer in the telescope is turned upright by turning the rectifying prism 18 by hand together with its holder 20. The mark plate 17 taking part in the rotary movements of the housing 23 is preferably constructed the same as in the first constructional form unless it be preferred to so mount the ocular 15, 16 together with the mark plate 17 on the telescope casing 19 that it can be rotated around the optical axis 28 of the ocular.

In the third example a cover plate 36 carrying a pointer 35 is rotatably mounted in a carrier 32 and is turned therein around the axis 38 by means of a worm 37; the carrier is provided with a dove tailed projection 33 for securing it to the gun and carries at its upper end a circumferential scale 34 cooperating with the pointer 35. This cover plate 36 is connected with a casing 39 rotatably mounted in the carrier 32 and provided with a tubular extension 40 the axis 41 of which is parallel to the axis 38 and around this axis an objective casing 42 is rotatable.

This objective casing 42 contains an objective 43 and in front thereof an erecting rhomboid reflecting prism 44 having a reflecting hypotenuse surface and deflecting the rays incoming through the objective opening 45, by an angle of 90° downwards in the direction of the axis 41 which is also the optical axis of the objective lens 43. Moreover the prism 44 is rotatable around an axis 46 which intersects at right angles the axis 41 at its point of intersection with the hypotenuse surface. On the cover plate 36 a toothed ring 47 is arranged concentrically to the axis 38 engaging into a toothed ring 48 of half the diameter of the ring 38 provided on the objective casing 42. The casing 39 contains a right angle reflecting prism 49 with two reflecting surfaces at right angles to each other which are inclined to the axis 38 at angles of 45° and therefore reflect the ray incoming in the direction of the axis 41 after a deflection by 180° upwards in the direction of the axis 38. The axis 38 is the optical axis of an ocular consisting of two lenses 50, 51 and provided with a target mark plate 52 located in its focal plane such ocular being mounted on the casing 39 and the cover plate 36 and capable of rotating around its optical axis. The ocular carries a toothed ring 53 coupled with a toothed wheel 56 of the same diameter as the toothed ring 53 and secured concentrically to the axis 38 in the carrier 32 by means of a shaft 55 journalled in the casing 39 and carrying two toothed wheels 54 equal in diameter.

Owing to the proportions above described of the toothed wheels 53, 54 and 56 this coupling acts on turning the casing 39 around the axis, 38 in such a manner that the ocular 50, 51 and the mark plate 52 retain unaltered their position relatively to the socket 32 and therefore also relatively to the observer. The objective casing 42, however, rotates around its axis 41 through twice the angle of rotation of the cover plate 36. The angles of rotation of the objective may be directly read by means of the pointer 35 on the scale 34 provided the latter be properly divided. The lateral angle of the target is adjusted by means of the worm 37 and the vertical sight angle of the target by turning the prism 44 around its axis 46. The image of the target seen by the observer in the field of vision of the telescope is upright for any lateral angle and the mark plate does not change its position relatively to the observer.

What we claim is:

1. In a sighting telescope for ordnance machine guns and the like having an objective opening for the entrance of a substantially horizontal incoming pencil of light, an objective lens, an ocular, and at least one reflecting element adapted to deflect by reflection the incoming pencil of light at an angle of 90° in a substantially vertical direction, a target mark in the said ocular, the said opening, the said reflecting element, and the said target mark being rotatable in unison around the substantially vertical axis of the ocular, the said target mark being adapted to coincide with the image produced in the ocular, and means for indicating the angle of rotation of the said opening, reflecting element, and target mark around the optical axis of the ocular.

2. In a sighting telescope for ordnance machine guns and the like having an objective opening for the entrance of a substantially horizontal incoming pencil of light, an objective lens, an ocular, and at least one reflecting element adapted to deflect by reflection the incoming pencil of light at an angle of 90° in a substantially vertical direction, a target mark in the said ocular, the said opening, the said reflecting element, and the said target mark being rotatable in unison around a substantially vertical axis being the optical axis of the ocular, the said target mark being adapted to coincide with the image produced in the ocular, and means for indicating the angle of rotation of the said opening, reflecting element, and target mark around the optical axis of the ocular in combination with a double reflecting element interposed between the first named reflecting element and the said ocular and adapted to deflect the vertical pencil of rays coming from the first reflecting element through an angle of 180° into the said ocular, a casing mounted to revolve around the vertical axis of the first named reflecting element, a spur wheel on such casing, a spur wheel rigidly connected to the ocular and engaging with the spur wheel on the said casing, the diameter of this latter spur wheel being half of the diameter of the spur wheel on the ocular.

In testimony whereof we have signed our names to this specification.

CHRISTIAN von HOFE.
KARL PETSCHENIG.
JOHANN SCHIER.